June 19, 1923.

F. MINAMI

STEM STRIPPER

Filed May 10, 1921

1,459,598

Inventor
Fusakichi Minami,

By
Geo. P. Kimmel, Attorney

Patented June 19, 1923.

1,459,598

UNITED STATES PATENT OFFICE.

FUSAKICHI MINAMI, OF SAN FRANCISCO, CALIFORNIA.

STEM STRIPPER.

Application filed May 10, 1921. Serial No. 468,332.

*To all whom it may concern:*

Be it known that I, FUSAKICHI MINAMI, a subject of the Emperor of Japan, residing at San Francisco, in the county of San Francisco and State of California, have invented certain new and useful Improvements in Stem Strippers, of which the following is a specification.

This invention relates to florists' tools and more particularly to strippers for removing leaves and branches from flowers and the like.

The object of the invention is to provide a simple and cheaply constructed implement of this character adapted at a single stroke to strip off the leaves and branches from the stems of roses, carnations and other flowers to be used in making them up in bunches, sprays and the like.

Another object is to provide a device of this character having a plurality of teeth or tines so arranged and constructed that the leaves and branches of flowers or other plants will be quickly and cleanly cut from the stem when the implement is drawn over the stem.

With these and other objects in view, the invention consists in certain novel features of construction as hereinafter shown and described and then specifically pointed out in the claims, and in the drawings illustrative of the preferred embodiment of the invention, Figure 1 represents a plan view of the tool constituting this invention.

Figure 1:
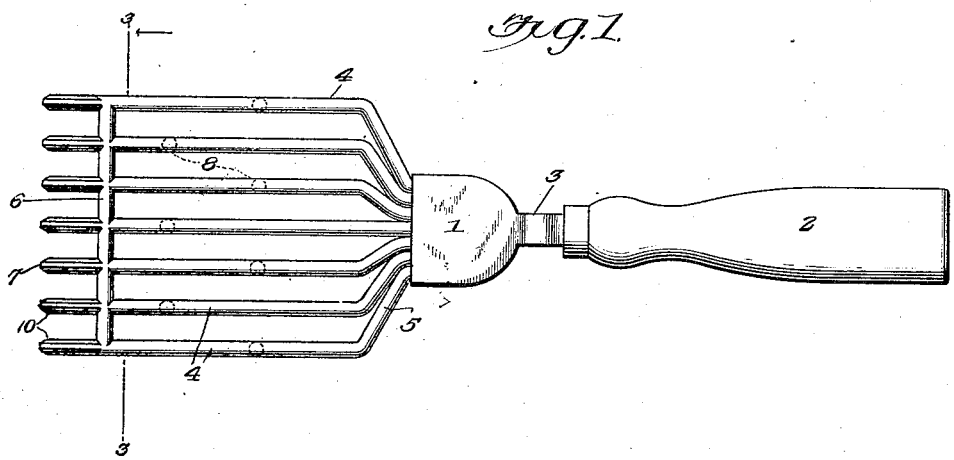
Figure 2:
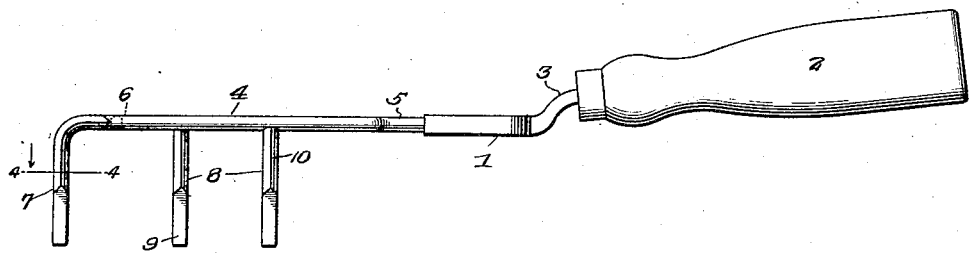
Fig. 2 is a side elevation thereof.
Figure 3:
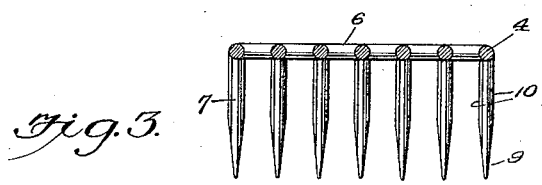
Fig. 3 is a transverse section taken on the line 3—3 of Fig. 1.

A tool in accordance with this invention, comprises a flat semi-oval shaped head 1 and a handle 2, the latter is connected to the head 1, by an outwardly projecting offset shank or neck 3. Projecting from the head 1, is a series of spaced parallel tines 4, each of which has its rear end converging rearwardly, as at 5, and connected with the head 1. A transverse connecting bar 6, is formed integral with and intersects the tines 4, in proximity to the forward ends thereof, and each of the tines 4, at its forward portion, is formed with a lateral prong 7, and which is disposed at right-angles to its respective tine 4. The prongs 7, are arranged in parallelism and each of the tines 4, between its prong 7 and its inner end, has formed integral therewith a lateral prong 8, disposed at right-angles to its respective tine. The prongs 8, are arranged in parallelism with respect to the prongs 7, and each of the prongs 7, 8, has its free end tapered, as at 9. The prongs 8, with respect to transverse alignment, are alternately disposed with respect to each other, as is clearly shown in Figure 1.

Figure 4:
Fig. 4 is a detail transverse section taken on the line 4—4 of Fig. 2.

Each of the prongs 7 and 8 are preferably made substantially diamond-shape in cross-section as shown in Fig. 4 with their opposed side edges sharpened, as shown at 10, to provide lengthwise cutting edges for severing the leaves and branches from the stems of flowers in connection with which the tool is to be used.

The cross bar 6, in connection with the head 1, holds the tines 4, rigidly in position.

When assembling roses, carnations and the like into sprays or bunches it is desirable to remove from the stems thereof all leaves and side branches and this tool is designed to accomplish this object in a quick and efficacious manner, the prongs 8 thereof when the tool is drawn over the stem operating to cut off the leaves and branches cleanly and quickly. In using the tool one long stroke from the top to the bottom of the stem is preferably made, the stem entering between two of the front prongs 7 and two intermediate prongs 8, thus causing the leaves and branches on the stem to be severed therefrom. As the edges of the stripper blades or prongs are sharp leaves are cut rather than broken from the stem.

While this implement is especially designed for the use of florists, it obviously may be used by others and for various other purposes.

The preferred embodiment of the invention is disclosed in the drawings and set forth in the specification, but it will be understood that any modifications within the scope of the claimed invention may be made in the construction without departing from the principle of the invention or sacrificing any of its advantages.

What I claim is:—

1. A tool for the purpose set forth comprising a handle element, a plurality of parallel tines connected at their inner ends with said element and provided at their forward termini with laterally extending prongs formed with lengthwise cutting edges, said tines further provided intermediate their ends with laterally extending prongs having lengthwise cutting edges and arranged in parallelism with respect to said first mentioned prongs.

2. A tool for the purpose set forth comprising a handle element, a plurality of parallel tines connected at their inner ends with said element and provided at their forward termini with laterally extending prongs formed with lengthwise cutting edges, said tines further provided intermediate their ends with laterally extending prongs having lengthwise cutting edges and arranged in parallelism with respect to said first mentioned prongs, and further alternately disposed with respect to each other in transverse alignment.

3. A tool for the purpose set forth comprising a handle element, a plurality of parallel tines connected at their inner ends with said element and provided at their forward termini with laterally extending prongs formed with lengthwise cutting edges, said tines further provided intermediate their ends with laterally extending prongs having lengthwise cutting edges and arranged in parallelism with respect to said first mentioned prongs, and means formed integral with said tines at a point removed from the forward termini thereof for maintaining the tines in spaced relation.

4. A tool for the purpose set forth comprising a handle element, a plurality of parallel tines connected at their inner ends with said element and provided at their forward termini with laterally extending prongs formed with lengthwise cutting edges, said tines further provided intermediate their ends with laterally extending prongs having lengthwise cutting edges and arranged in parallelism with respect to said first mentioned prongs, and further alternately disposed with respect to each other in transverse alignment, and means formed integral with said tines at a point removed from the forward termini thereof for maintaining the tines in spaced relation.

5. A tool for the purpose set forth comprising a flat head, a handle member connected to and offset with respect to said head, a series of forwardly projecting tines arranged in parallelism and spaced from each other, said tines having their rear termini converging and secured to said head, means formed integral with said tines inwardly with respect to the forward termini thereof for maintaining the tines in spaced relation, prongs formed integral and disposed at right angles with respect to the forward termini of the tines and arranged in parallelism, said prongs provided with lengthwise cutting edges, and prongs formed integral intermediate the ends of and disposed at right angles with respect to said tines and provided with cutting edges and further disposed in parallelism with the first mentioned tines.

6. A tool for the purpose set forth comprising a flat head, a handle member connected to and offset with respect to said head, a series of forwardly projecting tines arranged in parallelism and spaced from each other, said tines having their rear termini converging and secured to said head, means formed integral with said tines inwardly with respect to the forward termini thereof for maintaining the tines in spaced relation, prongs formed integral and disposed at right angles with respect to the forward termini of the tines and arranged in parallelism, said prongs provided with lengthwise cutting edges, and prongs formed integral intermediate the ends of and disposed at right angles with respect to said tines and provided with cutting edges and further disposed in parallelism with the first mentioned tines, and further alternately disposed with respect to each other and in transverse alignment with respect to the tines.

In testimony whereof, I affix my signature hereto.

FUSAKICHI MINAMI.